United States Patent
Clemo et al.

(10) Patent No.: US 6,850,396 B1
(45) Date of Patent: Feb. 1, 2005

(54) FAIL SAFE CIRCUIT WITH RESET CAPABILITY FOR A POWER SUPPLY

(75) Inventors: Raymond Mathew Clemo, Raleigh, NC (US); William Hemena, Raleigh, NC (US); Eino Alfred Lindfors, Durham, NC (US); Randhir Singh Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 09/721,231

(22) Filed: Nov. 22, 2000

(51) Int. Cl.[7] .............................................. H02H 3/00
(52) U.S. Cl. ............................ 361/78; 361/18; 361/90; 361/100
(58) Field of Search ............................ 361/78, 18, 115, 361/90, 92, 100, 91.1

(56) References Cited

U.S. PATENT DOCUMENTS 5,774,321 A * 6/1998 Kim et al. ..................... 361/94
6,241,530 B1 * 6/2001 Eddy et al. ................... 439/61

* cited by examiner

*Primary Examiner*—Stephen W. Jackson
(74) *Attorney, Agent, or Firm*—Sawyer Law Group

(57) ABSTRACT

Aspects of a fail safe circuit for protecting power supply operation from a failure are described. The fail safe circuit shutdowns at least one power supply when a preset threshold is exceeded and resets to resume normal operation following a temporary fault condition. The fail safe circuit includes a switch coupled to a voltage signal line of a branch of a power supply system, a current sense resistor coupled to the switch for detecting a failure condition in the branch, and a latch coupled to the current sense resistor and the switch for turning the switch off during the failure condition.

24 Claims, 2 Drawing Sheets

FAIL SAFE CIRCUIT WITH RESET CAPABILITY FOR A POWER SUPPLY

FIELD OF THE INVENTION

The present invention relates to power supplies, and more particularly to providing a fail safe monitoring circuit with reset capability for a power supply.

BACKGROUND OF THE INVENTION

While the size and speed of electronic components have received much focus and attention in the advancement of digital technology, ensuring proper power delivery to the components has remained a concern. The various branches within a system that rely on a power supply tend to be numerous and require differing levels of power. As the number of components within a system increases, the chance for failures and damage of the power supply of a system also increases.

Circuits to shutdown a power supply once a preset limit has been exceeded are usually not fail safe. For example, if any component within a monitoring circuit for a power supply fails, the protection provided by the circuit is lost. Furthermore, there is no built-in ability to detect and correct failures that are temporary within the monitoring circuit. Accordingly, a need exists for a technique that provides a fail safe monitoring circuit for a power supply that protects against short circuit and overload conditions while also providing recovery from temporary fault conditions to reset the fail safe circuit and resume normal operations. The present invention addresses such a need.

SUMMARY OF THE INVENTION

The present invention provides aspects of a fail safe circuit for protecting power supply operation from a failure. The fail safe circuit shutdowns at least one power supply when a preset threshold is exceeded and resets to resume normal operation following a temporary fault condition. The fail safe circuit includes a switch coupled to a voltage signal line of a branch of a power supply system, a current sense resistor coupled to the switch for detecting a failure condition in the branch, and a latch coupled to the current sense resistor and the switch for turning the switch off during the failure condition.

DETAILED DESCRIPTION OF THE INVENTION

The present invention relates to a fail safe circuit with reset capability for a power supply. The following description is presented to enable one of ordinary skill in the art to make and use the invention and is provided in the context of a patent application and its requirements. Thus, the present invention is not intended to be limited to the embodiment shown, but is to be accorded the widest scope consistent with the principles and features described herein.

Figure 1:
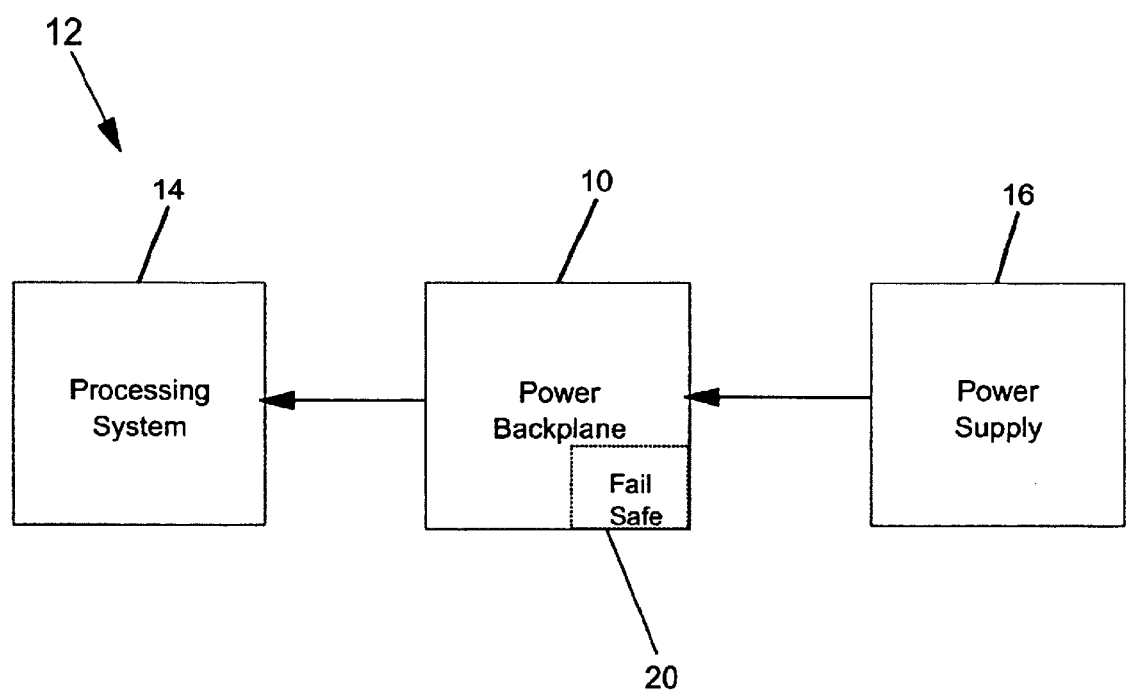
FIG. 1 illustrates an overall block diagram of a system that includes a fail safe circuit in accordance with the present invention.
Figure 2:
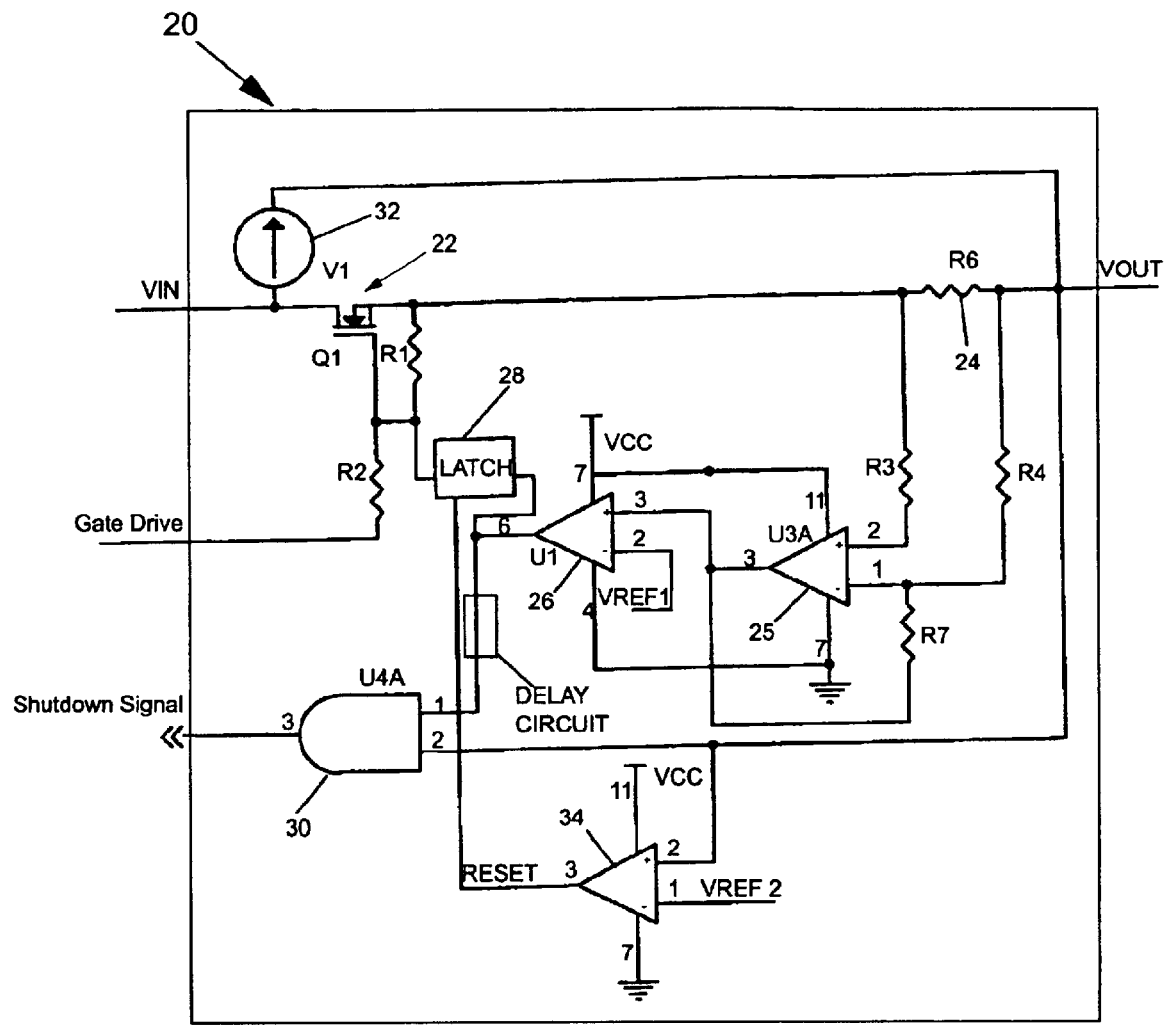
FIG. 2 illustrates a fail safe circuit in accordance with the present invention.

FIG. 1 illustrates a block diagram of a system in accordance with the present invention that includes a fail safe circuit and portions of a typical computer processing system, such as a computer server or the like. As represented by FIG. 1, coupled to a power backplane 10 of a system 12 is a processing system board 14 and at least one power supply 16. The system board 14 is coupled to a host of input and output devices (not shown), e.g., a keyboard, a pointing device, a flexible disk drive, and a monitor. Power, perhaps at multiple direct current voltage levels (if necessary), are applied by the power supply 16 to the power backplane 10. This applied power is distributed by the power backplane 10 via connections to the system I/O board as well as to other components (such as other backplanes and devices), not shown, of the system 12 which are mounted or connected to the power backplane. Thus, there can be several branches of the system that extend from the power supply 16 via the backplane 10. In accordance with the present invention, the power backplane 10 includes a fail safe circuit 20 for each branch, which is described in more detail with reference to FIG. 2.

In general, the fail safe circuit 20 operates to determine if current flowing through a branch exceeds a preset threshold, e.g., a 240 VA (volt-ampere) power limit, and to reset operation once a temporary fault is cleared. The fail safe circuit 20 shown in FIG. 2 includes a transistor switch 22 coupled to a voltage signal line, VIN, for the branch, and which is kept on during normal operation of the power system. Resistor 24 (e.g., 5 milliohm) coupled to the transistor 22 functions as a current sense resistor to monitor the branch current. Once the branch current exceeds a safe current, e.g., causes the preset threshold of 240 VA to be exceeded for the branch, the corresponding voltage level across the resistor 24 is sensed by comparator 25 and output to a comparator 26, which outputs a HIGH level signal. In turn, the output HIGH signal from comparator 26 sets latch 28. With the latch 28 set, the transistor switch 22 is turned off, thereby protecting the branch.

In order to protect against an internal fault which causes transistor switch 22 to short, combination logic 30 (e.g., an AND gate) is employed. When transistor switch 22 shorts out, the output voltage, VOUT, will be HIGH and the preset threshold/240 VA limit will be exceeded. Combinational logic 30 senses the HIGH level of VOUT and combines that with the level of the output signal from comparator 26. Since the output of comparator 26 will be HIGH due to the preset threshold being exceeded, combinational logic 30 outputs a HIGH level signal as a Shutdown Signal to shutdown the whole power system 16.

At times, a temporary fault causes a shutdown of the branch or whole system. For such momentary fault conditions, it is quite possible that the fault has been cleared and there is no overload fault condition or short circuit condition anymore. To account for this possibility, a current source 32 is included in the fail safe circuit 20 to feed a fixed current. By way of example, a current source providing 0.1 amp current would be suitable for a circuit monitoring for a 240 VA threshold. If the voltage measured at VOUT is found to be higher than a reference voltage (VREF2), e.g., 0.6 volt for a twelve-volt output, by a comparator 34, the output of the comparator 34 goes HIGH. The HIGH level signal acts as a RESET signal for the latch 28. Thus, once the temporary fault is cleared with the latch 28 reset, the transistor switch 22 is turned on, and normal operation resumes.

Although the present invention has been described in accordance with the embodiments shown, one of ordinary skill in the art will readily recognize that there could be variations to the embodiments and those variations would be within the spirit and scope of the present invention. For example, it should be appreciated that the values associated with the various components of the fail safe circuit shown in FIG. 2 can be chosen as necessary for particular system requirements. Thus, while the description has provided values suitable for use when monitoring for a 240 VA threshold, other values may be appropriate for other threshold levels, as is well understood by those skilled in the art. Accordingly, many modifications may be made by one of ordinary skill in the art without departing from the spirit and scope of the appended claims.

What is claimed is:

1. A system for protecting power supply operation from a failure, the system comprising:
    at least one power supply; and
    a power backplane coupled to the at least one power supply, wherein the power backplane includes a fail safe circuit that shutdowns the at least one power supply when a preset threshold is exceeded or when an internal fault occurs in the fail safe circuit, and resets to resume normal operation following a temporary fault condition.

2. The system of claim 1 wherein the preset threshold corresponds to 240 VA power level.

3. The system of claim 1 wherein the fail safe circuit further comprises:
    a switch coupled to a voltage signal line of a branch of a power supply system;
    a current sense resistor coupled to the switch for detecting a failure condition in the branch; and
    a latch coupled to the current sense resistor and the switch for turning the switch off during the failure condition.

4. The system of claim 3 wherein the fail safe circuit further comprises at least one comparator coupled between the current sense resistor and the latch to set the latch during the failure condition.

5. The system of claim 4 wherein the fail safe circuit further comprises combinational logic coupled to the at least one comparator and the current sense resistor for outputting a shutdown signal when the switch is shorted.

6. The system of claim 5 wherein the combinational logic further comprises an AND gate.

7. The system of claim 5 wherein the fail safe circuit further comprises a current source coupled to the voltage signal line to supply a current between an input node and an output node of the fail safe circuit.

8. The system of claim 7 wherein the fail safe circuit further comprises a reset comparator coupled to the output node for providing a signal level to reset the latch.

9. The system of claim 8 wherein the reset latch turns the switch on for resumption of normal circuit operation following a temporary short circuit of the switch.

10. A method for protecting power supply operation from a failure, the method comprising the steps of:
    (a) providing a fail safe circuit in a power backplane; and
    (b) utilizing the fail safe circuit to shutdown at least one power supply coupled to the power backplane when a preset threshold is exceeded or when a fault occurs in the fail safe circuit and to reset and resume normal operation following a temporary fault.

11. The method of claim 10 wherein providing a fail safe circuit step (a) further comprises the steps of:

(a1) providing a switch coupled to a voltage signal line of a branch of a power supply system;
    (a2) providing a current sense resistor coupled to the switch for detecting a failure condition in the branch; and
    (a3) providing a latch coupled to the current sense resistor and the switch for turning the switch off during the failure condition.

12. The method of claim 11 further comprising the step of (c) providing at least one comparator coupled between the current sense resistor and the latch to set the latch during the failure condition.

13. The method of claim 12 further comprising the step of (d) providing combinational logic coupled to the at least one comparator and the current sense resistor for outputting a shutdown signal when the switch is shorted.

14. The method of claim 13 wherein the combinational logic further comprises an AND gate.

15. The method of claim 13 further comprising the step of (e) providing a current source coupled to the voltage signal line to supply a fixed current between an input node and an output node of the fail safe circuit.

16. The method of claim 15 further comprising the step of (f) providing a reset comparator coupled to the output node for providing a signal level to reset the latch.

17. The method of claim 16 wherein the reset latch turns the switch on for resumption of normal circuit operation following a temporary short circuit of the switch.

18. The method of claim 10 wherein the preset threshold corresponds to 240 VA power level.

19. A power supply fail safe circuit comprising:
    a switch coupled to a voltage signal line of a branch of a power supply system;
    a current sense resistor coupled to the switch for detecting a failure condition in the branch;
    a latch coupled to the current sense resistor and the switch for turning the switch off during the failure condition at least one comparator coupled between the current sense resistor and the latch to set the latch during the failure condition; and
    combinational logic coupled to the at least one comparator and the current sense resistor for outputting a shutdown signal when the switch is shorted.

20. The circuit of claim 19, wherein the preset threshold corresponds to 240 VA power level.

21. The circuit of claim 19 wherein the combinational logic further comprises an AND gate.

22. The circuit of claim 19 further comprising a current source coupled to the voltage signal line to supply a fixed current between an input node and an output node of the fail safe circuit.

23. The circuit of claim 22 further comprising a reset comparator coupled to the output node for providing a signal level to reset the latch.

24. The circuit of claim 23 wherein the reset latch turns the switch on for resumption of normal circuit operation following a temporary short circuit of the switch.

* * * * *